United States Patent
Koshimizu et al.

(10) Patent No.: US 9,053,336 B2
(45) Date of Patent: Jun. 9, 2015

(54) DOCUMENT DISPLAY SYSTEM, DISPLAY DEVICE, CONTROLLER AND COMPUTER READABLE MEDIUM

(75) Inventors: Minoru Koshimizu, Kanagawa (JP); Naoki Hayashi, Kanagawa (JP); Toshiroh Shimada, Kanagawa (JP); Tsutomu Ishii, Kanagawa (JP); Yasunori Saito, Kanagawa (JP); Yoko Kurihara, Kanagawa (JP); Hiroe Okuyama, Kanagawa (JP); Tomoyuki Shoya, Kanagawa (JP); Shigehiko Sasaki, Kanagawa (JP); Akira Ichiboshi, Kanagawa (JP); Tsunemasa Mita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1769 days.

(21) Appl. No.: 12/073,119

(22) Filed: Feb. 29, 2008

(65) Prior Publication Data

US 2008/0270918 A1    Oct. 30, 2008

(30) Foreign Application Priority Data

Apr. 25, 2007 (JP) ................................. 2007-114976

(51) Int. Cl.
- *G09G 5/00* (2006.01)
- *G06F 21/62* (2013.01)
- *G06F 17/30* (2006.01)

(52) U.S. Cl.
CPC ........ *G06F 21/6218* (2013.01); *G09G 2300/02* (2013.01); *G06F 17/30011* (2013.01); *G06F 2221/2113* (2013.01)

(58) Field of Classification Search
CPC .................. G09G 2300/02; G09G 2300/023; G09G 2300/026; G09G 2380/14
USPC .............. 345/1.1–1.3, 2.1–2.3; 715/730–753, 715/761
See application file for complete search history.

(56) References Cited

U.S. PATENT DOCUMENTS

| 5,943,679 A   | * | 8/1999  | Niles et al. .................... 715/247 |
| 6,628,244 B1  | * | 9/2003  | Hirosawa et al. ............... 345/2.3 |
| 7,249,324 B2  | * | 7/2007  | Nakamura et al. ............. 715/776 |
| 8,248,424 B2  | * | 8/2012  | Shoya et al. .................... 345/531 |
| 8,375,284 B2  | * | 2/2013  | Hirose et al. ................... 715/205 |
| 2003/0210226 A1 | * | 11/2003 | Ho et al. ........................ 345/156 |

(Continued)

FOREIGN PATENT DOCUMENTS

| JP | A-2004-233603 | 8/2004  |
| JP | A-2004-286952 | 10/2004 |
| JP | A-2005-010831 | 1/2005  |

OTHER PUBLICATIONS

Aug. 27, 2014 Office Action issued in Japanese Patent Application No. 2007-114976 (with translation).

*Primary Examiner* — Alexander Eisen
*Assistant Examiner* — Nelson Lam
(74) *Attorney, Agent, or Firm* — Oliff PLC

(57) ABSTRACT

A document display system includes: a plurality of display units that display an image of an electronic document including a plurality of pages for each page unit; a plurality of detecting units that detect a display operation performed by a user to each of the plurality of display units; and a control unit that controls the display unit related to the detecting unit that detects the display operation to display a page image in order of the pages corresponding to the order of detecting the display operations.

4 Claims, 7 Drawing Sheets

(56) References Cited

U.S. PATENT DOCUMENTS

| | | | |
|---|---|---|---|
| 2005/0203819 A1* | 9/2005 | Rogers et al. | 705/35 |
| 2005/0246621 A1* | 11/2005 | Ogawa et al. | 715/500 |
| 2006/0242556 A1* | 10/2006 | Koshimizu et al. | 715/507 |
| 2007/0174918 A1* | 7/2007 | Hirose et al. | 726/26 |
| 2007/0208785 A1* | 9/2007 | Hayashi et al. | 707/203 |
| 2007/0265994 A1* | 11/2007 | Ueda | 707/1 |
| 2008/0088882 A1* | 4/2008 | Hirose et al. | 358/296 |
| 2013/0002523 A1* | 1/2013 | Alston-Hughes | 345/1.3 |
| 2014/0267026 A1* | 9/2014 | Olsen, Jr. | 345/156 |

\* cited by examiner

| MEDIUM ID RECEIVING DATE | MEDIUM ID | PAGE IMAGE TRANSMITTING DATE |
|---|---|---|
| ⋮ | ⋮ | ⋮ |

*FIG. 6*

| DOCUMENT ID | RIGHT |
|---|---|
| DOC.1 | LOW |
| DOC.2 | LOW |
| DOC.3 | HIGH |
| ⋮ | ⋮ |

*FIG. 7*

| USER ID | RIGHT |
|---|---|
| USER 1 | HIGH |
| USER 2 | INTERMEDIATE |
| USER 3 | LOW |
| ⋮ | ⋮ |

*FIG. 8*

| MEDIUM ID | RIGHT |
|---|---|
| DEVICE 1 | HIGH |
| DEVICE 2 | INTERMEDIATE |
| DEVICE 3 | HIGH |
| ⋮ | ⋮ |

DOCUMENT DISPLAY SYSTEM, DISPLAY DEVICE, CONTROLLER AND COMPUTER READABLE MEDIUM

CROSS-REFERENCE TO RELATED APPLICATIONS

This application is based on and claims priority under 35 U.S.C. 119 from Japanese Patent Application No. 2007-114976 filed Apr. 25, 2007.

BACKGROUND

1. Technical Field

The present invention relates to a document display system, a display device, a controller and a computer readable medium.

2. Related Art

A printed matter ordinarily serves to display a fixed image by supplying a coloring material or a developing material such as ink or toner to a medium such as paper. As a medium by which such a medium for fixedly displaying and holding the image can be replaced, a displaying and holding medium has been studied and developed on which an image is formed so as to be rewritten depending on an external wiring force and the formed image is displayed and held even after the external writing force is removed.

Such a displaying and holding medium includes a displaying material for forming the image in a display part as an area for displaying and holding the image. The external writing force (a chemical action such as electric, magnetic, heat, liquid of prescribed PH) is allowed to act on the displaying material, so that the state of the displaying material is physically or chemically changed to form the image corresponding to the external writing force. Further, even after the external writing force is removed, the formed image is maintained. Further, when a different external writing force is allowed to act on the image, the previous image is changed to an image corresponding to the new external writing force. As described above, in view of a point that a displayed state is maintained (stored) under a state that the external writing force is removed, the displaying and holding medium is similar to paper. In addition thereto, in view of a point that the displayed image can be rewritten without externally supplying the coloring material or a developer, the displaying and holding medium is similar to an electronic device. Thus, the displaying and holding medium is referred to as electronic paper.

SUMMARY

According to an aspect of the present invention, a document display system including: a plurality of display units that display an image of an electronic document including a plurality of pages for each page unit; a plurality of detecting units that detect a display operation performed by a user to each of the plurality of display units; and a control unit that controls the display unit related to the detecting unit that detects the display operation to display a page image in order of the pages corresponding to the order of detecting the display operations.

The present invention simply designates by a user on which display device, which page is displayed, when an electronic document including a plurality of pages is displayed for a page unit on a plurality of display devices that are not previously ordered.

BRIEF DESCRIPTION OF THE DRAWINGS

Exemplary embodiment of the present invention will be described in detail based on the following figures, wherein:

FIG. 6 is a diagram showing a document right table according to another embodiment of the present invention;

FIG. 7 is a diagram showing a user right table according to another embodiment of the present invention;

FIG. 8 is a diagram showing a medium right table according to another embodiment of the present invention;

DETAILED DESCRIPTION

Now, the present invention will be specifically described on the basis of embodiments.

Figure 1:
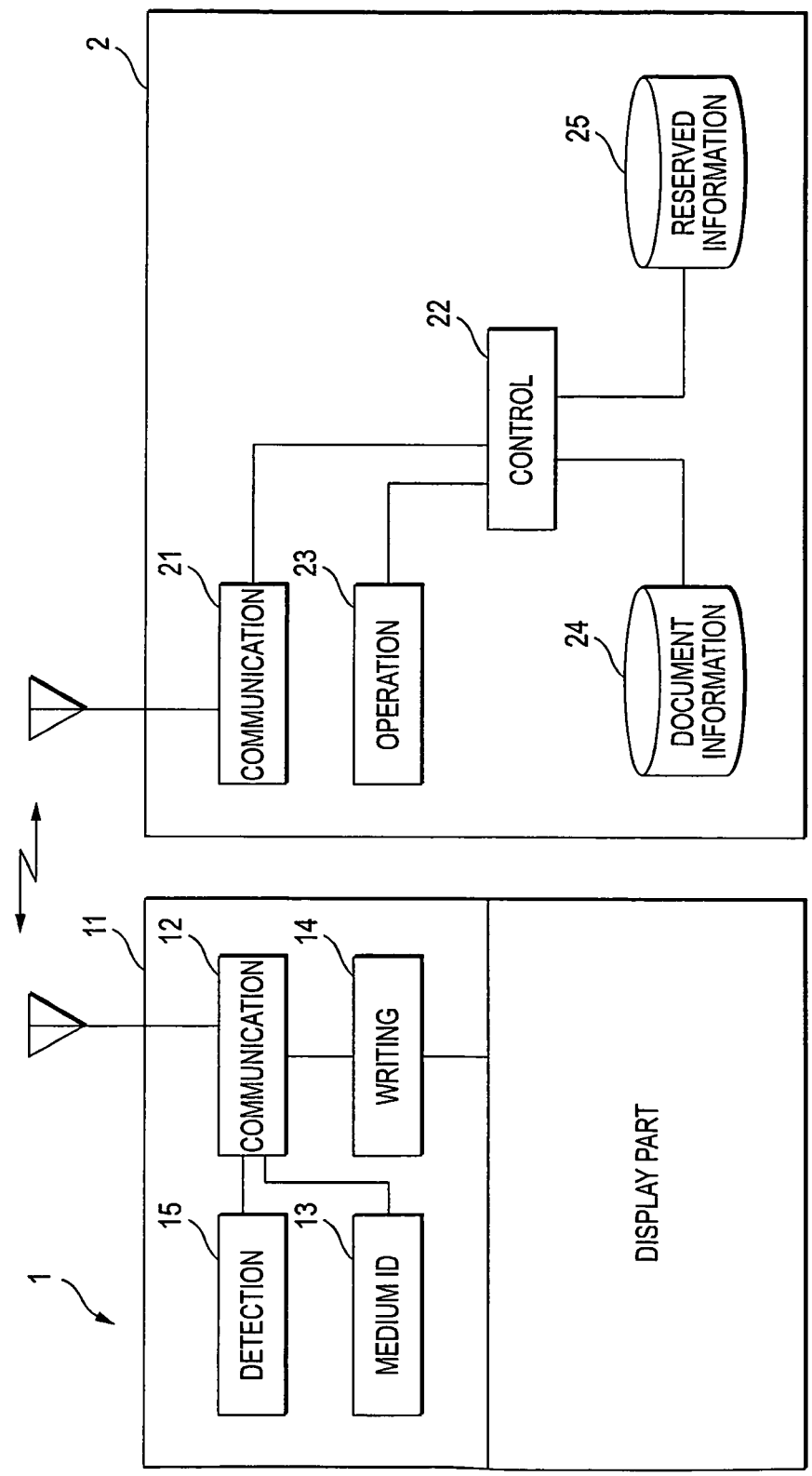
FIG. 1 is a diagram showing a functional structure of a document display system according to one embodiment of the present invention.

FIG. 1 shows the structure of a document display system according to one embodiment of the present invention. In this structure, a display device 1 and a controller 2 make a radio communication with each other. The document display system of this embodiment has a plurality of display devices 1. In FIG. 1, one of the display devices is shown as a representative.

In the document display system of this embodiment, the display device 1 is formed with a displaying and holding medium (what is called electronic paper) on which an image is formed so as to be rewritten in accordance with an external writing force and the formed image is displayed and held even after the external writing force is removed.

As a display principle of the electronic paper, may be used display principles for driving elements in a manner like a chain reaction, for instance, a display principle that an external force such as an electric force, a magnetic force, a thermal force, etc. is directly applied to drive elements, a display principle that elements are driven by a voltage change due to an irradiation of light, a display principle that a colored state is changed by the change of PH of liquid due to an application of voltage.

As one example of the electronic paper, the electronic paper that rewrites an image by applying light (refer it to as an optically write type electronic paper, hereinafter) will be specifically described below.

Figure 11:
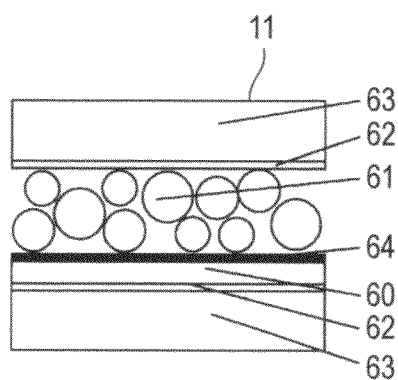
FIG. 11 is a diagram for explaining the structure of an optically write type electronic paper.

The optically write type electronic paper includes, as illustrated in FIG. 11 showing a sectional structure of a display part 11 that occupies a substantial part of the medium, a layer of an organic photo-conductive material (an organic photo-conductive layer) 60 used for a photosensitive member of a copying machine and a layer of a liquid crystal display material (a micro-capsulated cholesteric liquid crystal layer) 61 that are combined together, a pair of front and back transparent electrodes 62 that sandwich these layers in between them and a pair of front and back transparent base material films 63 that sandwich this laminated body in between them. In this structure, the cholesteric liquid crystal layer 61 can realize a white color display that reflects the light of a wide visible wavelength area and a monochromatic image of a black color display obtained by allowing the light to be transmitted to the liquid crystal layer 61 and absorbed by a black layer 64 provided between the cholesteric liquid crystal layer 61 and the organic photo-conductive layer 60. Further, a cholesteric liquid crystal has a feature of interfering with and reflecting a color light corresponding to a spiral pitch. Thus, the cholesteric liquid crystal layer 61 is formed by laminating liquid crystals having different spiral pitches, so that a color display can be realized by a simple structure.

Figure 12:
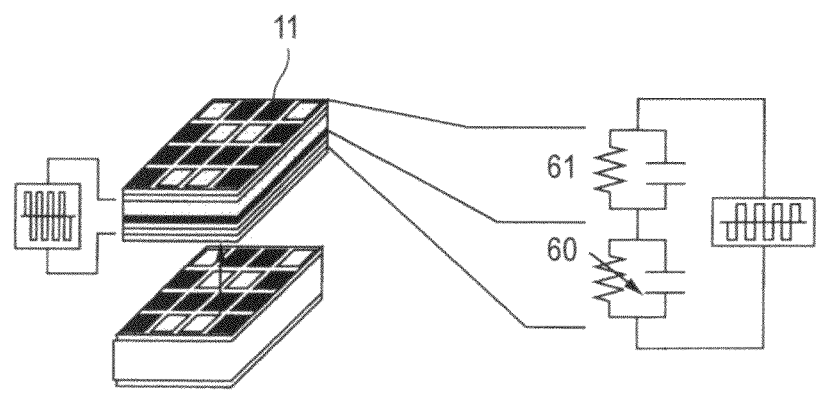
FIG. 12 is a diagram for explaining an operational principle of the optically write type electronic paper.

Then, as illustrated in FIG. 12 showing an operational principle of the display part 11, in the optically write type electronic paper, when an image transferred to, for instance, a light adjusting element panel (a light emitting panel) for writing an image is displayed and projected on the display part 11 and a voltage is applied to a writing electrode provided in the display part 11, the display part 11 instantaneously converts the strength and weakness of the light into a reflection density and holds the projected image. Then, an erasing voltage is applied to the electrode so that image information held by the display part 11 can be erased. The optically write type electronic paper can be reused many times by repeating a writing process and an erasing process. In the optically write type electronic paper, the voltage is applied to the electrode as described above without carrying out such an erasing process to project a new image on the display part, so that the image can be overwritten on the image information held by the display part 11. The optically write type electronic paper can be also reused many times by such an overwriting process.

As another example of an electronic paper, an electronic paper (refer it to as an electrically rewrite type electronic paper, hereinafter) will be specifically described in which an electric power is directly applied to rewrite an image.

Figure 13:
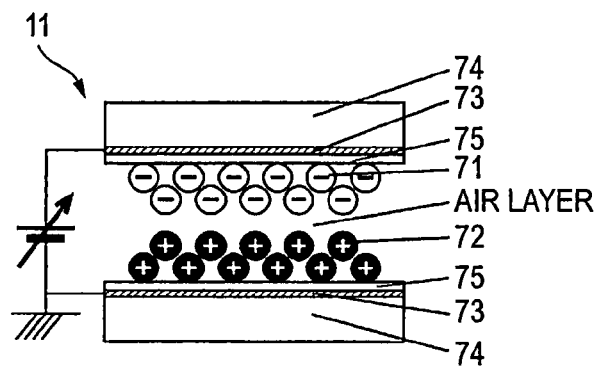
FIG. 13 is a diagram for explaining the structure of an electrically rewrite type electronic paper.

The electrically rewrite type electronic paper includes, as illustrated in FIG. 13 showing a sectional structure of a display part 11 that occupies a substantial part of a medium, fine colored and charged particles (in an illustrated example, white particles 71 and black particles 72) sealed between a pair of front and back electrodes 73 having at least a transparent front side and a pair of front and back film base plates 74 having at least a transparent front side that sandwich the electrodes 73 in between them. An air layer is provided between the electrode layers 73 so that the colored particles can freely move. Further, in the matrix shaped electrode layers 73, insulating layers 75 are provided to prevent the color particles 71 and 72 from coming into contact with the electrode layers. A color filter may be used to realize a color display by a simple structure.

Figure 14:
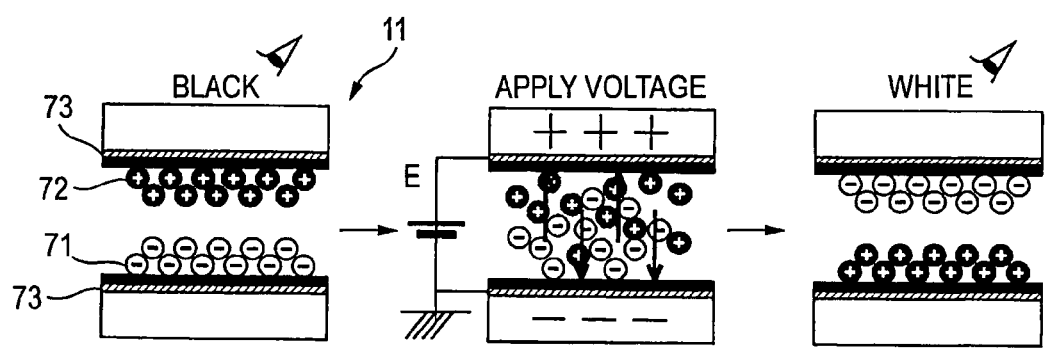
FIG. 14 is a diagram for explaining an operational principle of the electrically rewrite type electronic paper.

As illustrated in FIG. 14 showing an operational principle of the display part 11, in the electrically rewrite type electronic paper, under a state that a voltage is not applied to the electrode 73 (in this case, it is assumed that the polarity of the electrode 73 during a driving operation the last time is plus), the white particles 71 charged to a minus are accumulated on a back surface side. On the other hand, the black particles 72 charged to a plus accumulated on the front surface side. Thus, when the display part 11 is visually observed from the front surface side, the display part is in a state of a black color.

Then, when a driver (a below-described writing unit 14) connected to the electrically rewrite type electronic paper is operated in accordance with image data to invert the polarity of the electrode of a prescribed part of a matrix of the display part 11 corresponding to an image to be displayed by the function of the driver, a positional relation of the white particles 71 and the black particles 72 is changed so that an image by the contrast between the white particles 71 and the black particles 72 is displayed. When the driver is operated in accordance with different image data, an image displayed on the display part 11 can be switched by the contrast between the white particles 71 and the black particles 72 and the electrically rewrite type electronic paper can be reused many times.

In this embodiment, the display device 1 is formed by using the electrically rewrite type electronic paper. As shown in FIG. 1, the display device 1 includes a display part 11 for displaying and holding an image, a communication unit 12 for carrying out a radio communication with the controller 2, a medium ID storing unit 13 for storing a medium ID for identifying a self device, a writing unit 14 for writing an image received from the controller 2 in the display part 11 and a detecting unit 15 for detecting a display operation carried out by a user to the self device.

Figure 2:
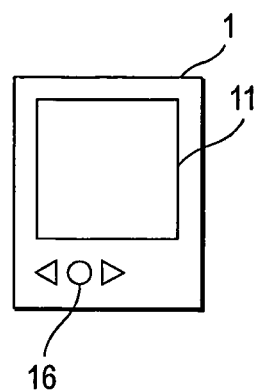
FIG. 2 is a diagram showing an external appearance of a display device according to one embodiment.

Further, in an external appearance of the device shown in FIG. 2, a button 16 for instructing to update a display by the display part 11 is provided as an operating element to receive the pressing down operation of the user as the display operation.

The device is not limited to a structure using the displaying and holding medium (the electronic paper) for the display device 1 as in this embodiment. A device such as a liquid crystal display may be used that carries out a display operation by other displaying principle.

Further, a sensor for sensing a contact by the user (for instance, an electrostatic sensor, an acceleration sensor, a pressure sensor) may be used as the operating element in place of the button 16.

Further, for instance, the certification of the user necessary for a precondition of activating the display device 1 or displaying a page by the display device 1 may be detected as the display operation.

The controller 2 of this embodiment includes, as shown in FIG. 1, a communication unit 21 for carrying out a radio communication with the display device 1, a control unit 22 for controlling a transmission of a page image to the display device 1, an operating unit 23 for receiving the input of an operation from the user, a document information storing unit 24 for storing the information of an electronic document and a reserved information storing unit 25 for storing the medium IDs received from the display device in order of receiving them.

In this embodiment, a portable telephone is used as the controller 2. However, for instance, other portable devices such as a PDA (Personal Digital Assistants) or a stationary type device such as a desk top personal computer may be employed.

Further, in this embodiment, the page image of each page is formed in accordance with the electronic document held in the document information storing unit 24 and the formed page image is transmitted to the display device 1. However, for instance, the page image may be formed in accordance with the electronic document received from other device through a network and transmitted to the display device 1. An image formed by a shooting function or an image reading function of the self device or other device may be previously held and transmitted to the display device 1.

A flow of processes by the document display system of this embodiment will be described by referring to FIG. 3.

Figure 3:
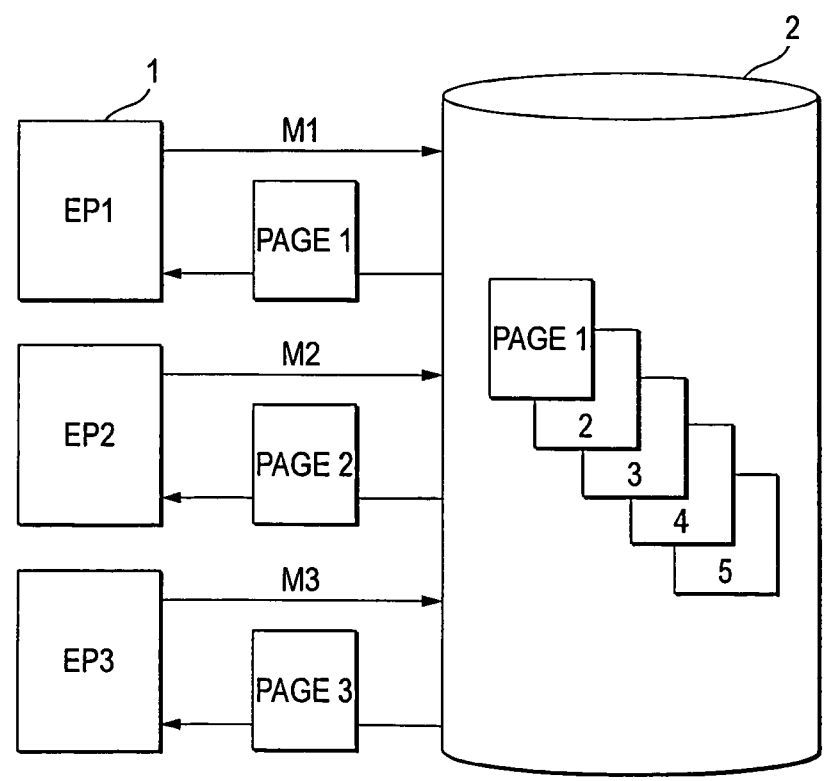
FIG. 3 is a diagram for explaining an order of displaying pages according to one embodiment of the present invention.

It is assumed that the display devices 1 (EP1, EP2, EP3) shown in FIG. 3 are respectively located within a range where the display devices can carry out the radio communication with the controller 2 (in this embodiment, within a range of 30 cm from the controller 2).

When the user operates the controller 2 to instruct to output the electronic document including a plurality of pages (in this embodiment, 5 pages), the control unit 22 controls the page images of the pages respectively to become a waiting state for being transmitted in order from a top page. At this time, "1" is set as the information of a page to be processed indicating the first page that is not transmitted yet, and stored in a memory of the controller 2.

Initially, when the user presses down the button 16 of the EP1 to carry out the display operation, the EP1 detects the display operation by the detecting unit 15 to transmit operation instructing information M1 including a self medium ID to the controller 2 by the communication unit 12. When the controller 2 receives the operation instructing information M1 under the control of the control unit 22, the controller 2 forms the page image of a page 1 in accordance with the information of the page to be processed "1" to transmit the page image to the EP1 as a source of transmission of the operation instructing information M1 by the communication unit 21, and adds "1" to the information of the page to be processed to obtain "2". When the EP1 receives the page image of the page 1, the EP1 displays the page image on the display part 11 by the writing unit 14.

Then, when the user presses down the button 16 of the EP2 to carry out the display operation, the EP2 detects the display operation and transmits operation instructing information M2 including a self medium ID to the controller 2. When the controller 2 receives the operation instructing information M2, the controller 2 transmits the page image of a page 2 formed in accordance with the information of the page to be processed "2" to the EP2, and adds "1" to the information of the page to be processes to obtain "3". When the EP2 receives the page image of the page 2, the EP2 displays the page image on the display part 11.

Further, when the user presses down the button 16 of the EP3 to carry out the display operation, the same processes are carried out by the RP3 and the controller 2 and a page 3 is displayed on the display part 11 of the EP3.

Namely, the page images in order of the pages corresponding to the order of pressing down the button are respectively displayed on the display devices 1 by such a simple operation as to press down the buttons 16 of the display devices 1 respectively.

Under the above-described state, when the user further presses down the button 16 of the EP2, the display of the EP2 is switched from the page 2 to a page 4. Thus, a situation that the number of the prepared display devices 1 is smaller than the number of the pages of the electronic document can be met.

In this embodiment, since the displaying and holding medium (the electronic paper) more inexpensive than the liquid crystal display is used as the display device 1, the user is assumed to have a plurality of display devices 1. Accordingly, when this system is used, an arbitrary number of display devices may be considered to be prepared. Even if a sequential relation is not set to the arbitrary number of the display devices 1, when the pages of the electronic document having the arbitrary number of pages are displayed in order of the pages, the display device 1 used for a display can be simply designated at a timing of actually displaying each page.

The document display system of this embodiment includes not only an instantaneous display function that rapidly displays a corresponding page image in accordance with the detection of the display operation carried out by the user to the display device 1 as described above, but also a display reserving function that temporarily stores an order of detecting the display operations to display the page image on the corresponding display device 1 in accordance with a display instruction outputted by operating the display device 1 or the controller 2 by the user or a display instruction automatically transmitted at intervals of prescribed time. Which of the instantaneous display function and the display reserving function is used can be designated by operating the controller 2 by the user.

Figures 4, 5:
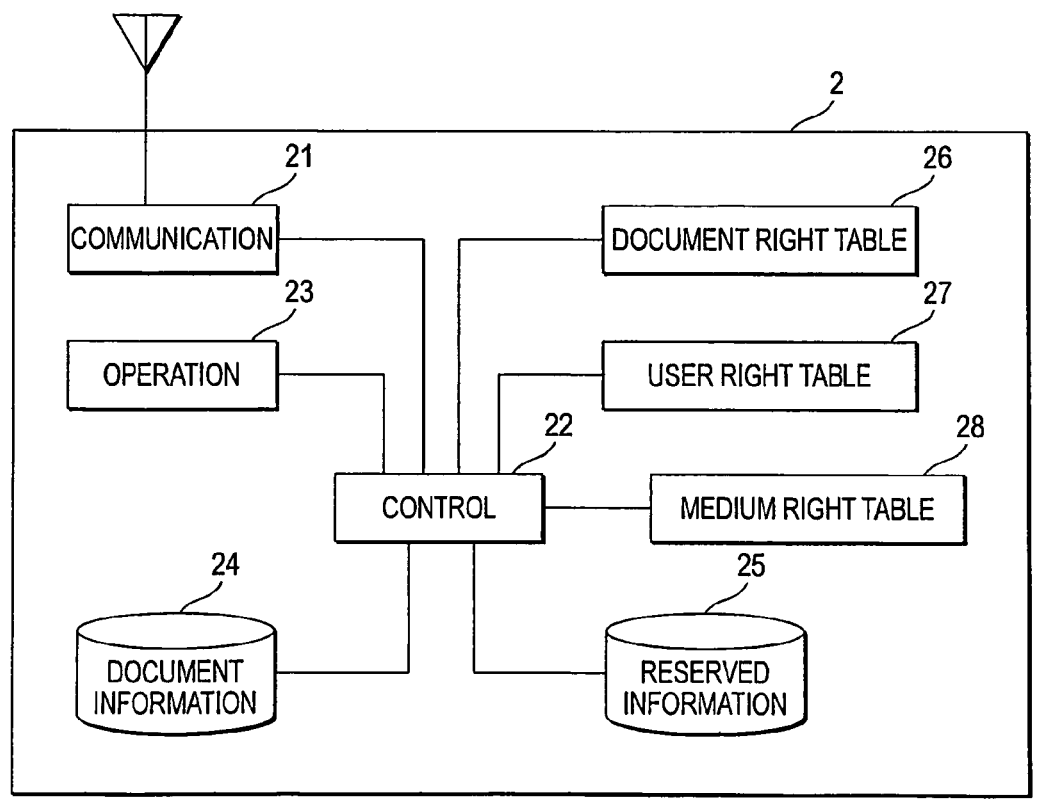
FIG. 4 is a diagram showing the structure of data of reserved information according to one embodiment of the present invention.
FIG. 5 is a diagram showing a functional structure of a controller according to another embodiment of the present invention.

FIG. 4 shows a structural example of data of preserved information used in the display reserving function.

The reserved information of this embodiment is information having a set of a "medium ID" included in the operation instructing information transmitted from the display devices 1 respectively, a "medium ID receiving date" showing that the operation instructing information (the medium ID) is received and a "page transmitting date" showing that the page image is transmitted to the display device. The reserved information is stored in the reserved information storing unit 25. That is, an order of receiving the operation instructing information (the medium ID) can be respectively specified by the medium ID receiving date.

Now, a process carried out when the display reserving function is designated will be described below.

When the operation instructing information is received from the display device 1, the reserved information is formed by using the medium ID included in the operation instructing information and the receiving date thereof and stored in the reserved information string unit 25. At this time, the column of the page transmitting date of the reserved information is blank.

When the page image is instructed to be displayed, the reserved information in which the medium ID receiving date is the first and the page transmitting date is blank is specified to transmit the page image corresponding to a page number to be processed to the display device 1 corresponding to the medium ID of the reserved information. Further, a present date is recorded in the page transmitting date of the reserved information to add the page number to be processed.

FIG. 5 shows, as another embodiment of the present invention, a functional structure of a controller 2 in a document display system having a function for limiting the display of each page of an electronic document for each user or each display device 1.

The controller 2 of this embodiment further includes a document right table 26 in which a right required for displaying each electronic document is set, a user right table 27 in which a right permitted to each user is set and a medium right table 28 in which a right permitted to each display device 1 in addition to the controller 2 shown in FIG. 1.

In this embodiment, as shown in FIGS. 6 to 8, the rights of three stages of high, intermediate and low are set. When the right of the user or the display device 1 is the same as or higher than the right of the electronic document, the display of the electronic document is permitted. On the other hand, when the right of the user or the display device 1 is lower than the right of the electronic document, the pages of the electronic document are respectively inhibited from being displayed.

Specifically, when the display is limited for each display device 1, the controller 2 specifies the right of the display device 1 in accordance with a medium ID included in received operation instructing information to compare the right with the right of an electronic document as an object and decide whether or not the display to the display device 1 is permitted. When the display is permitted (when the right of the display device 1 is the same as or higher than the right of the electronic document), the controller 2 returns a page image. Thus, for instance, such a restriction may be put as to display the electronic document only on the display device 1 that is prepared in, for instance, a conference room and inhibited from being carried, and not to display the electronic document on the display device 1 possessed by each individual.

Further, if the display is limited for each user, when each display device 1 transmits the operation instructing information, the display device 1 transmits a user ID for identifying the user together therewith. The controller 2 obtains the right of the user in accordance with the received user ID to compare the right with the right of the electronic document as an object and decide whether or not the display to the user is permitted. When the display is permitted (when the right of the user is the same as or higher than the right of the electronic document), the controller 2 returns the page image. Thus, for instance, a restriction may be put that even when there is a display device 1 of other person within a communication range of the controller 2, the controller 2 controls the electronic document not to be displayed on the display device 1.

In this embodiment, the user ID previously stored in the display device 1 is transmitted to the controller 2 to decide the right. However, for instance, the display device 1 may be provided with a function for receiving an input of the user ID and a password from the user or a function for reading biological features respectively different for the users such as a fingerprint, a sign or the like to transmit these features to the controller 2, certify the user and then decide the right. Further, the controller 2 may be provided with a coordinating table of the user ID and the medium ID to specify the user ID in accordance with the medium ID transmitted from the display device 1 and decide the right.

In this embodiment, the right is set in the document right table 26 for an electronic document unit, however, the right may be set for a page unit.

Figure 9:
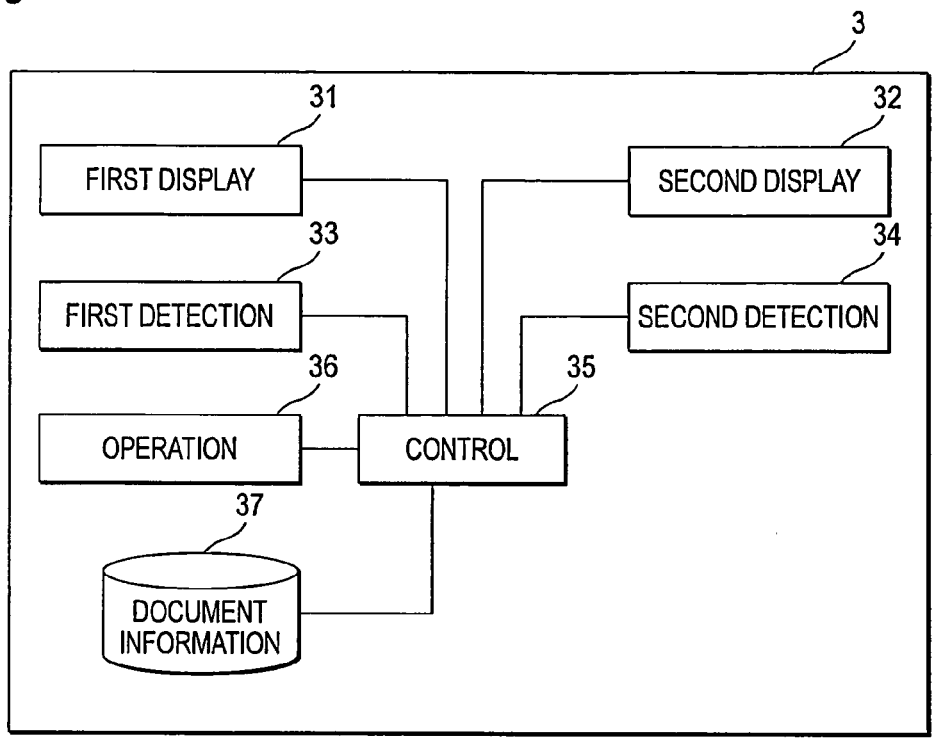
FIG. 9 is a diagram showing a functional structure of a display device according to a still another embodiment of the present invention.
Figure 10:
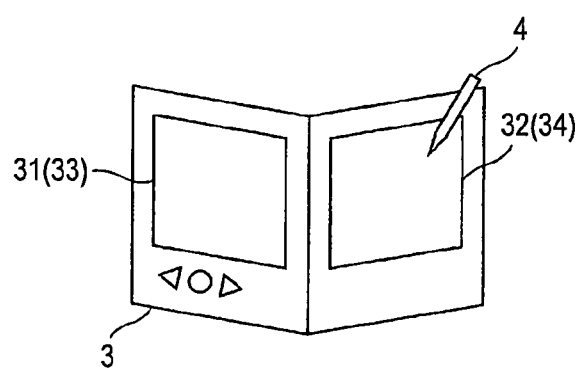
FIG. 10 is a diagram showing an external appearance of the display device according to a still another embodiment.

FIG. 9 is shows a functional structure of a display device 3 according to a still another embodiment of the present invention. FIG. 10 shows an external appearance of the display device 3.

The display device 3 of this embodiment includes a first display unit 31 and a second display unit 32 for displaying an image, a first detecting unit 33 for detecting a display operation carried out by a user to the first display unit 31, a second detecting unit 34 for detecting a display operation carried out by the user to the second display unit 32, a control unit 35 for controlling the display of a page image by the first display unit 31 and the second display unit 32, an operating unit 36 for receiving an input of an operation from the user and a document information storing unit 37 for storing the information of an electronic document.

In this embodiment, pressure sensitive sheets for sensing the contact of a pen 4 are provided over the substantially entire surfaces of the first display unit 31 and the second display unit 32 and the first detecting unit 33 and the second detecting unit 34 are formed by the pressure sensitive sheets. That is, the touch of the pen to the first display unit 31 or the second display unit 32 is detected as the display operation and the page image in order of pages corresponding to the order of detecting the display operations is displayed by the corresponding first display unit 31 or second display unit 32.

Here, the display devices 1, 3 and the controller 2 of the above-described embodiments respectively are realized by executing a program according to the present invention by a computer having resources of hardware of a calculating part such as a CPU (Central Processing Unit) or a storing part such as a RAM (Random Access Memory).

Specifically, the program according to the present invention is previously stored and held in a ROM (Read Only Memory) provided in the computer. The program is read, developed in the storing part and executed by the calculating part to realize function units according to the present invention.

For instance, a medium connecting part such as a slot for loading an external storing medium such as a CD-ROM (Compact Disc Read Only Memory) or a memory cartridge may be provided in the computer to read the program by the medium connecting part from the external storing medium that stores and holds the program according to the present invention so as to be read by the computer and execute the program. Further, for instance, a communication part may be provided in the computer for communicating with a server device having a function for transmitting the program according to the present invention through a network to receive the program from the server device by the communication part and execute the program. Further, the program according to the present invention externally obtained as described above may be stored and held in an HDD (Hard Disk Drive) of the computer to read and execute the program from the HDD.

The function units of the present invention may be formed not by a software structure as described above, but by an exclusive hardware circuit.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

FIG. 1
11 display part
12 communication
13 medium ID
14 writing
15 detection
21 communication
22 control
23 operation
24 document information
25 reserved information
FIG. 5
21 communication
22 control
23 operation
24 document information
25 reserved information
26 document right table 27 user right table
28 medium right table
FIG. 9
31 first display
32 second display
33 first detection
34 second detection
35 control
36 operation
37 document information

What is claimed is:

1. A document display system comprising:
a plurality of display units that display an image of an electronic document including a plurality of pages;
a plurality of detecting units that detect a display operation performed by a user to each of the plurality of display units, the plurality of display devices having no sequential relationship to one another with respect to the electronic document;
a plurality of display devices including the plurality of display units and the plurality of detecting units;
a control unit that controls each one of the plurality of display units related to a corresponding one of the plurality of detecting units that detects the display operation to display a plurality of page images in an order corresponding to the order of detecting the display operations; and
a controller including the control unit, wherein:
the plurality of page images are sequentially displayed on the plurality of display units, the plurality of display units having no immediate sequential relationship to one another with respect to the electronic document,
each of the plurality of page images is displayed on one of the plurality of display units and is not displayed on others of the plurality of display units,
each of the plurality of display devices include:
a first transmitting unit that transmits device identifying information for identifying a self to the controller in accordance with the detection of the display operation of a detecting unit corresponding to each of the plurality of the display devices; and
a first receiving unit that receives from the controller a page image allowed to be displayed on a displaying unit corresponding to each of the plurality of the display devices,
the controller includes:
a second receiving unit that receives the device identifying information from the plurality of display devices;
a second transmitting unit that transmits the page image to the plurality of display devices;
a first storing unit that stores the device identifying information of each of the plurality of the display device permitting each of the pages to be displayed; and
a second storing unit that stores user identifying information for identifying the user who permits each page to be displayed,
the control unit controls the page image in order of the pages corresponding to the order of receiving the device identifying information to be transmitted to a display device corresponding to the device identifying information by the second transmitting unit,
in a case where the display device corresponding to the received device identifying information is permitted to display an object page, the control unit transmits the page image of the object page to the display device by the second transmitting unit,
the first transmitting unit transmits the user identifying information of the user who operates the display device together with the device identifying information, and
in a case where user corresponding to the user identifying information received together with the device identifying information is permitted to display the object page, the control unit controls the page image of the object page to be transmitted to the display device corresponding to the device identifying information by the second transmitting unit.

2. The document display system as claimed in claim 1, wherein the control unit stores information showing the display units related to the detection of the display operations in order of detection of the display operations and controls the display unit in order of detection corresponding to the order of the pages of the page image to display the page image in accordance with an instruction for displaying the page image.

3. The document display system as claimed in claim 1, wherein the page image is a first page of the electronic document, and a subsequent displayed page image of the plurality of page images is not a page of the electronic document immediately subsequent to the first page of the electronic document.

4. The document display system as claimed in claim 1, wherein the page image is a first page of the electronic document, and a subsequent displayed page image of the plurality of page images is a third page of the electronic document, the third page of the electronic document being immediately subsequent to a second page of the electronic document, the second page being immediately subsequent to the first page of the electronic document.

* * * * *